United States Patent [19]

Ishida et al.

[11] Patent Number: 5,796,949
[45] Date of Patent: Aug. 18, 1998

[54] VIDEO DATA SENDING DEVICE AND DATA HIGH-RATE RETURNING DEVICE FOR SENDING A DATA THROUGH A COMPUTER NETWORK

[75] Inventors: Takashi Ishida; Yasuhiro Yoshida, both of Osaka; Hideyuki Oka, Neyagwa, all of Japan

[73] Assignee: Matsushita Electric Industrial Co., Ltd., Osaka, Japan

[21] Appl. No.: 529,568

[22] Filed: Sep. 18, 1995

[30] Foreign Application Priority Data

Sep. 20, 1994 [JP] Japan .................................. 6-225193
Nov. 14, 1994 [JP] Japan .................................. 6-279509

[51] Int. Cl.$^6$ .............................. G06F 15/16; H04N 7/14
[52] U.S. Cl. ........................ 395/200.47; 348/12; 348/13; 455/5.1
[58] Field of Search ............................ 348/6, 7, 12, 13; 395/200.09, 200.03, 200.47, 200.31; 455/4.1, 4.2, 5.1, 6.1, 6.2; H04N 7/14

[56] References Cited

U.S. PATENT DOCUMENTS 5,500,681   3/1996   Jones ............................ 348/12

Primary Examiner—Sherrie Hsia
Attorney, Agent, or Firm—Ratner & Prestia

[57] ABSTRACT

A video data sending device comprises a receiving part for receiving sending requests from terminals, a second request section part for determining whether the sending request is for video data, a video data management part for executing sending control of the video data, a video data sending part for returning the video data to the terminal corresponding to the sending request for the video data, a data management part for executing sending control data other than video data and a data sending part for returning the data other than video data to the terminal. A data high-rate returning device comprises a data storing part for storing returning data; a receiving part for receiving a packet having a sending request from each terminal; a header information storing part for storing sending-request-packet header information and returning packet header information; a returning packet preparation part which obtains i) sending-request-packet header information from the packet, ii) returning packet header information from the header information storing part, and iii) returning data from the data storing part, and prepares a returning packet and a sending part for sending the returning packet to the terminal.

16 Claims, 12 Drawing Sheets

Fig. 8

| | Sending-request-packet header information | | Returning packet header information | |
|---|---|---|---|---|
| 1 | Sending source address | 0:0:8e:6:12:1a | Sending source address | 0:0:8e:6:12:1b |
| | Sending destination address | 0:0:8e:6:12:1b | Sending destination address | 0:0:8e:6:12:1a |
| | Protocol ID | 0×05 | Protocol ID | 0×05 |
| 2 | Sending source address | 0:0:8e:6:12:2a | Sending source address | 0:0:8e:6:12:2b |
| | Sending destination address | 0:0:8e:6:12:2b | Sending destination address | 0:0:8e:6:12:2a |
| | Protocol ID | 0×05 | Protocol ID | 0×05 |
| ... | | | | |
| 5 | Sending source address | 0:0:8e:6:12:5a | Sending source address | 0:0:8e:6:12:5b |
| | Sending destination address | 0:0:8e:6:12:5b | Sending destination address | 0:0:8e:6:12:5a |
| | Protocol ID | 0×05 | Protocol ID | 0×05 |

Fig. 9

| Sending-request-packet 1 |
|---|
| Sending-request-packet 2 |
| Sending-request-packet 3 |
| Sending-request-packet 4 |
| ⋮ |
| Sending-request-packet 10 |

5,796,949

VIDEO DATA SENDING DEVICE AND DATA HIGH-RATE RETURNING DEVICE FOR SENDING A DATA THROUGH A COMPUTER NETWORK

BACKGROUND OF THE INVENTION

1. Field of the Invention

The present invention relates to a video data sending device for sending video data through a computer network.

Also, the present invention relates to a communication using a packet composed of a data part and a header part, and to a returning procedure in a returning device for preparing a return packet for a receiving packet with a sending request and returning the return packet, and particularly to a data high-rate returning device which is effective where many packets each of which has a sending request like video data are received from a few sending sources.

2. Related Art of the Invention

Heretofore, a data communication through a computer network has employed mainly a system, which is called a server-client system, in which a data sending request is sent from a terminal for utilizing data which is called a client computer to a server computer for storing and controlling data, and the server computer sends the data at a rate as high as possible to the client computer in response to the sending request. At that point, the sending request is generally divided into small units to request data sending so that the client computer does not occupy the computer network. In this manner, even when one client computer sends a sending request, a sending request from another client computer interrupts the data returning for the divided sending request and thus can be processed by the server computer, whereby the computer network may be utilized by many client computers at the same time.

However, in such a conventional method of communicating data in a computer network, when the number of client computers requesting sending data at the same time increases, the processing of a server computer for the sending request from one client computer does not become constant, so that it has been difficult to send data such as video data which must be sent at a constant rate at all times.

Referring to FIG. 4, there is shown therein a typical view showing a procedure of sending data in a conventional computer network. A computer network 400 is connected with a server computer 401 and client computers 402, 403. For example, sending requests a1, a2, a3 for requesting to send video data A are sent from the client computer 402 to the server computer 401. In response to the requests, data A1, A2, A3 obtained by dividing the video data A into small units are sent through the computer network 400 to the client computer 402. At the same time as this point, when sending requests b1, b2, b3 for requesting to send video data B are sent from the client computer 403 to the server computer 401, the sending of data A1, A2, A3 and the sending of data B1, B2, B3 from the server computer 401 conflicted each other, so that data could not be received at a timing expected by the client computer side.

However, in such a conventional procedure of communicating data, in response to the sending request from a client computer, the server computer cannot send data at a constant rate, so that data, particularly such as video required to be sent to a client computer at a constant rate could not be sent at a stable rate.

As a method of communicating video data on a computer network, there has been implemented a method of loading a communication software for video data communication on all computers connected to a computer network. The method is used to make it possible to send video data which is difficult on a conventional computer network by using a communication software for video data for the sending request from a client computer and the data sending from a server computer.

However, in a method of using a communication software for sending video data, the sending of the video data could be guaranteed only when respective communication softwares are loaded on all computers connected to a computer network. That is, there have been problems that respective communication softwares must be loaded on all computers possibly connected to a computer network, and that these communication softwares must be newly loaded on the computer shaving already been connected.

Also, a conventional server-client type data communication method has a precondition that even when a client computer sends a data sending request to a server computer, the client computer has a possibility of being waited for a time to some extent, so that the extra number of client computers exceeding that of client computers to which the server computer can send data at the same time could be added. However, for video data communication, in response to the sending request from a client computer, data sending cannot be waited, so that only the extra number of client computers not exceeding the sending ability of the server computer could be added.

With reference to FIG. 5, a conventional returning procedure will be explained. A conventional data returning device comprises a receiving part 501, a returning packet preparation part 502, a sending part 503 and a data storing part 504.

The operation of the data returning device will be explained hereinafter. The receiving part 501 receives a packet with a sending request and transfers the packet to the returning packet preparation part 502. The returning packet preparation part 502 refers to a header part of the packet with a sending request and prepares header information for a returning packet. Also, the returning packet preparation part 502 refers to information of communication data requested in the data part of the packet with a sending request, obtains returning data corresponding to the information of the data part from the data storing part 504, prepares the data part of the returning packet, and combines the header information of the returning packet with the returning data to prepare the returning packet. The sending part 503 sends the returning packet prepared by the returning packet preparation part 502.

However, in such a conventional data returning device, the returning packet preparation part 502 refers to the header part of the packet with a sending request for the each packet to prepare the header part of a corresponding returning packet, so that even when the packets each of which has the same header part are continuously received, the returning packet preparation part 502 must repeat the same processing, and as a result, has had a wasteful processing time. Particularly, where many packets each of which has a sending request of video data are received from a few sending sources, there has been a problem that a frequent re-execution of the same processing would cause a long redundant processing time.

OBJECTS OF THE INVENTION

The present invention is made in view of such problems in a conventional data communication procedure, and it is an object of the invention to provide a video data sending device which makes it possible to return video data even where terminals each of which sends a packet with a sending request are increased.

It is another object of the invention to provide a data high-rate returning device which can return data at a high rate even where a few sending sources send packets each of which has a sending request of many packets.

To achieve the above objects, the invention provides a video data sending device, comprising: a receiving part for receiving a sending request sent from each of plural terminals to receive either video data or data other than video data, the video data being stored in a video data storing part, the data other than video data being stored in a data storing part; a sending request selection part for selectively determining whether the sending request received by the receiving part is either the one relating to the video data or the one relating to the data other than video data; a video data management part which where the sending request selectively determined by the sending request selection part is the one relating to the video data, executes sending control of the video data; a video data read part for reading the video data from said video data storing part according to the sending control of the video data; a video data sending part for returning the video data read by the video data read part to the terminal corresponding to the sending request; a data management part which where the sending request selectively determined by the sending request selection part is the one relating to the data other than video data, executes sending control of the data; a data read part for reading the data other than video data from the data storing part according to the sending control of the data; and a data sending part for returning the data other than video data read by the data read part to the terminal corresponding to the sending request.

Also, to achieve the above objects, the invention provides a data high-rate returning device, comprising: a data storing part in which returning data has been stored; a receiving part for receiving a packet having a sending request sent from each of plural terminals connected to a network, the packet being composed of a header part and a data part; a header information storing part in which there have been previously stored plural sets of data composed of a set of sending-request-packet header information included in the packet received by the receiving part and returning packet header information corresponding to the sending-request-packet header information; a returning packet preparation part which obtains the sending-request-packet header information from the packet received by the receiving part, obtains the returning packet header information corresponding to the obtained sending-request-packet header information from the header information storing part, obtains returning data from the data storing part on the basis of the data part included in the packet having the obtained sending-request-packet header information, and prepares at least one returning packet by the obtained returning packet header information and the obtained returning data; and a sending part for sending at least the one returning packet prepared by the returning packet preparation part to the terminal on the basis of the returning packet header information included in the prepared returning packet.

More, to achieve the above objects, the invention provides a data high-rate returning device, comprising: a data storing part in which returning data has been stored; a receiving part for receiving a packet having a sending request sent from each of plural terminals connected to a network, the packet being composed of a header part and a data part; a header information storing part in which there have been previously stored plural sets of data composed of a set of sending-request-packet header information included in the packet received by the receiving part and returning packet header information corresponding to the sending-request-packet header information; a returning packet preparation part which obtains the sending-request-packet header information from the packet received by the receiving part, and where the obtained sending-request-packet header information is different from the preceding one, obtains the returning packet header information corresponding to the obtained sending-request-packet header information from the header information storing part, obtains returning data from the data storing part on the basis of the data part included in the packet having the obtained sending-request-packet header information, and prepares at least one returning packet by the obtained returning packet header information and the obtained returning data, and where the obtained sending-request-packet header information is the same as the preceding one, obtains the returning packet header information corresponding to the obtained sending-request-packet header information from the header information storing part, obtains returning data from the data storing part on the basis of the data part included in the packet having the obtained sending-request-packet header information, and prepares at least one returning packet by the previously obtained returning packet header information and the obtained returning data; and a sending part for sending at least the one returning packet prepared by the returning packet preparation part to said terminal on the basis of the returning packet header information included in the prepared returning packet.

Further, to achieve the above objects, the invention provides a video data sending device, comprising: a receiving part for receiving a packet having a sending request sent from each of plural terminals connected to a network to receive either video data or data other than video data, the packet being composed of a header part and a data part, the video data being stored in a video data storing part, the data other than video data being stored in a data storing part; a sending request selection part for selectively determining whether the packet received by the receiving part is either the one relating to the video data or the one relating to the data other than video data; a video data management part which where the packet selectively determined by the sending request selection part is the one relating to the video data, executes sending control of the video data; a header information storing part in which there have been previously stored plural sets of data composed of a set of sending-request-packet header information included in the packet received by the receiving part and returning packet header information corresponding to the sending-request-packet header information; a returning packet preparation part which obtains the sending-request-packet header information from the packet received by the receiving part according to the sending control of the video data, obtains the returning packet header information corresponding to the obtained sending-request-packet header information from the header information storing part, obtains video data from the video data storing part on the basis of the data part included in the packet having the obtained sending-request-packet header information, and prepares at least one returning packet by the obtained returning packet header information and the obtained video data; a video data sending part for sending at least the one returning packet prepared by the returning packet preparation part to the terminal on the basis of the returning packet header information included in the prepared returning packet; a data management part which where the packet selectively determined by the sending request selection part is the one relating to the data other than video data, executes sending control of the data; a data read part for reading the data other than video data from the data storing part according to the sending control of the data; and a data sending part which generates at least one packet on the basis of the data other than video data read by the data read part, and returns the generated packet to the terminal corresponding to the generated packet.

Furthermore, to achieve the above objects, the invention provides a video data sending device, comprising: a receiving part for receiving a packet having a sending request sent from each of plural of terminals connected to a network to receive either video data or data other than video data, the packet being composed of a header part and a data part, the video data being stored in a video data storing part, the data other than video data stored in a data storing part; a sending request selection part for selectively determining whether the packet received by the receiving part is either the one relating to the video data or the one relating to the data other than video data; a video data management part which where the packet selectively determined by the sending request selection part is the one relating to the video data, executes sending control of the video data; a header information storing part in which there have been previously stored plural sets of data composed of a set of sending-request-packet header information included in the packet received by the receiving part and returning packet header information corresponding to the sending-request-packet header information; a returning packet preparation part which obtains the sending-request-packet header information from the packet received by the receiving part according to the sending control of the video data, and where the obtained sending-request-packet header information is different from the preceding one, obtains the returning packet header information corresponding to the obtained sending-request-packet header information from the header information storing part, obtains video data from the video data storing part on the basis of the data part included in the packet having the obtained sending-request-packet header information, and prepares at least one returning packet by the obtained returning packet header information and the obtained video data, and where the obtained sending-request-packet header information is the same as the preceding one, obtains the returning packet header information corresponding to the obtained sending-request-packet header information from the header information storing part, obtains video data from the video data storing part on the basis of the data part included in the packet having the obtained sending-request-packet header information, and prepares at least one returning packet by the previously obtained returning packet header information and the obtained video data; a video data sending part for sending at least the one returning packet prepared by the returning packet preparation part to the terminal on the basis of the returning packet header information included in the prepared returning packet; a data management part which where the packet selectively determined by the sending request selection part is the one relating to the data other than video data, executes sending control of the data; a data read part for reading data other than video data from the data storing part according to the sending control by the data management part; and a data sending part which generates at least one packet on the basis of the data other than video data read by the data read part, and returns the generated packet to the terminal corresponding to the generated packet.

BRIEF DESCRIPTION OF THE DRAWINGS

These and other objects, advantages, features, and uses will become more apparent as the description proceeds, when considered with the accompanying drawings in which:

FIG. 8 is a chart showing data composed of a set of receiving packet header information and sending packet header information previously stored in a header information storing part 605;

FIG. 9 is a chart showing an example of data stored in a sending request-packet-storing buffer 706;

FIG. 11 is a block diagram of software configuration by using CPU 11a; and

DETAILED DESCRIPTION

Figure 1:
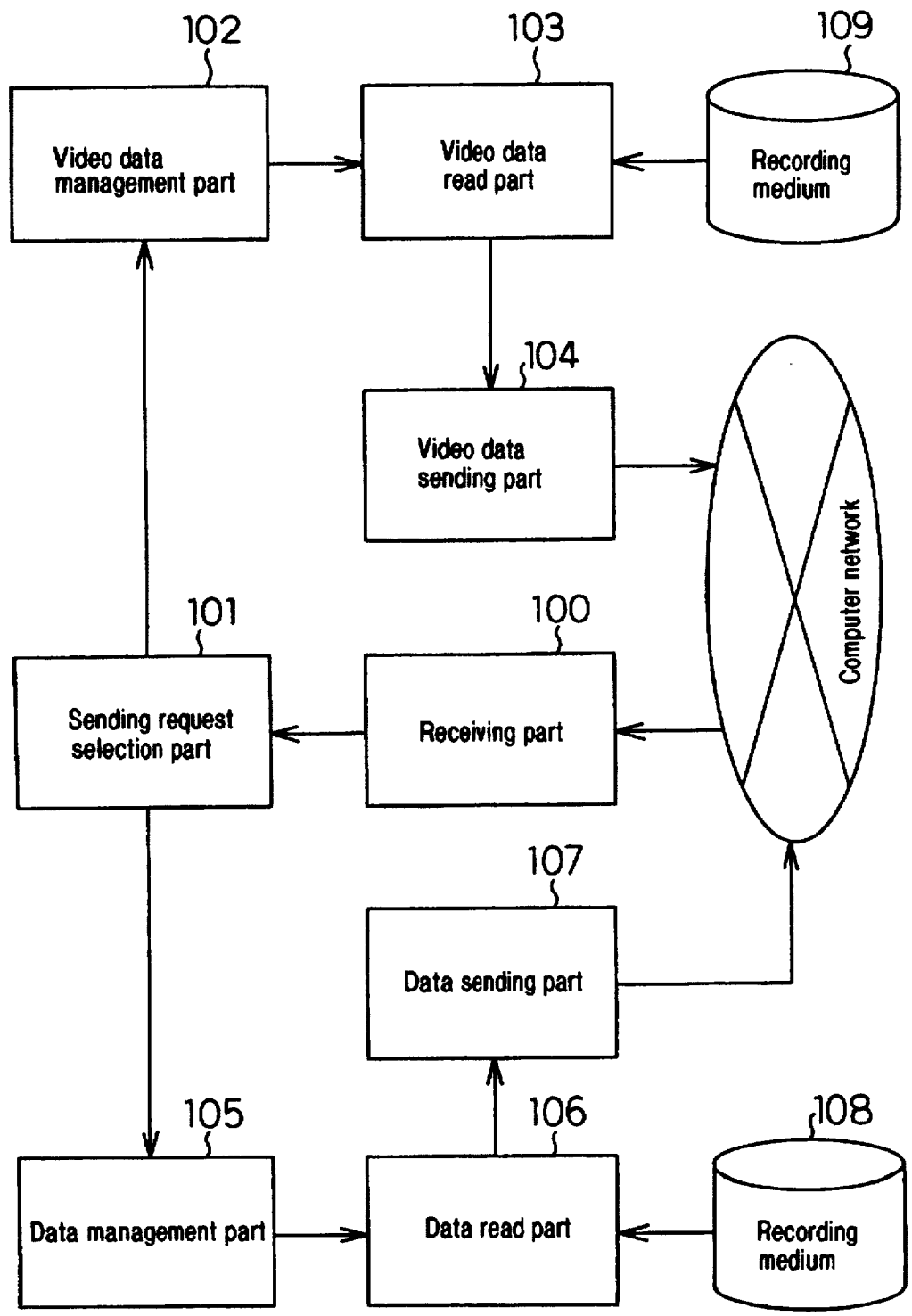
FIG. 1 is a block diagram of a first embodiment in connection with a video data sending device of the present invention.

Referring now to FIG. 1, there is shown therein a block diagram of a first embodiment in connection with a video data sending device of the present invention. The video data sending device comprises receiving part 100, sending request selection part 101, video data management part 102, video data read part 103, video data sending part 104, data management part 105, data read part 106 and data sending part 107.

With reference to FIG. 1, the operation of each part of the video data sending device in this embodiment will be explained hereinafter. The receiving part 100 receives a data sending request sent through a computer network from a terminal. The sending request selection part 101 selectively determines whether the data sending request from the terminal received at the receiving part 100 is either the sending request for the video data managed at the video data management part 102 or the sending request for the data managed at the data management part 105.

The video data management part 102 manages all video data stored in a recording medium 109, and directs the video data read part 103 to read video data for the data sending request. The video data read part 103 reads the video data from the recording medium 109 storing the video data. The video data sending part 104 returns appropriate video data at a regeneration rate thereof through the computer network to the terminal having sent the sending request for the video data.

On the other hand, the data management part 105 manages other data excluding the video data, and directs the data read part 106 to read the data for the sending request. The data read part 106 reads the data from a recording medium 108 storing other data excluding the video data. The data sending part 107 returns the data excluding video data (or audio video data) through the computer network to the terminal.

Figure 2:
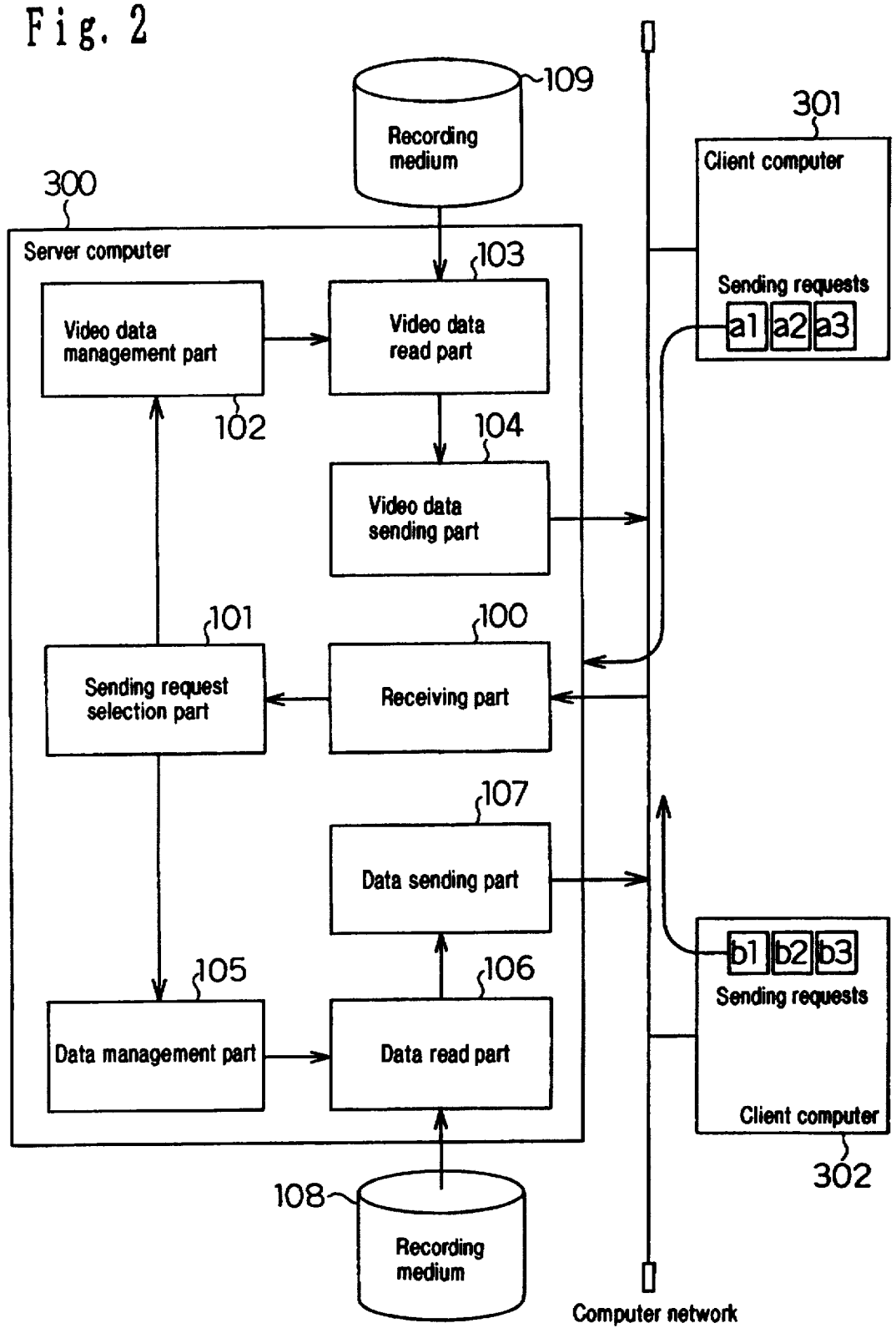
FIG. 2 is a block diagram expressing a state of video data sending in the embodiment.

FIG. 2 is a block diagram expressing a state of video data sending in the embodiment. Reference code 300 designates a server computer including the video data sending device of this embodiment; and 301 and 302 designate client computers connected through a computer network. With reference to FIG. 2, the sending procedure of the video data in this embodiment will be explained.

1. Where sending request of video data is received:

There will be explained a case where the sending request of video data is sent from the client computer 301 to the server computer 300. The receiving part 100 of the server computer 300 receives the sending request of video data and sends it to the sending request selection part 101. The sending request selection part 101 inquires where the data corresponding to the received sending request are managed from the video data management part 102 and the data management part 105, and sends the sending request to the managing side. In this case, since the sending request is for video data, the sending request selection part 101 sends the sending request to the video data management part 102. The video data management part 102 directs the video data read part 103 to read the video data corresponding to the sending request. The video data read part 103 reads the video data from the recording medium 109 having stored the video data, and sends it to the video data sending part 104. The video data sending part 104 returns the received video data toward the client computer 301 at a video regeneration rate at which the image regeneration at the terminal is in time.

2. Where sending request of data excluding video data is received:

There will be explained a case where the sending request of data excluding video data is sent from the client computer 302 to the server computer 300. The receiving part 100 of the server computer 300 receives the sending request of data excluding video data and sends it to the sending request selection part 101. The sending request selection part 101 inquires where the data corresponding to the received sending request are managed from the video data management part 102 and the data management part 105, and sends the sending request to the managing side. In this case, since the sending request is for data other than video data, the sending request selection part 101 sends the sending request to the data management part 105. The data management part 105 directs the data read part 106 to read the data corresponding to the sending request. The data read part 106 reads the data from the recording medium 108 having stored the data, and sends it to the data sending part 107. The data sending part 107 returns the data received from the data read part 106 toward the client computer 302 without delaying the sending of the video data from the video data sending part 104 sent according to the sending request of video data from another terminal.

3. Where sending requests of data other than video data and video data are received from a plurality of client computers:

There will be explained a case where the server computer 300 receives the sending request of video data from the client computer 301, and at the same time, receives the sending request of data other than video data from the client computer 302. In this case, the server computer 300 performs the processing of the sending request of video data according to the sending procedure explained in the above-mentioned case 1, and in parallel to the processing, performs the processing of the sending request of data other than video data according to the sending procedure explained in the above-mentioned case 2. That is, the server computer 300 returns appropriate video data to the client computer 301, and in parallel to the processing, returns appropriate data other than video data to the client computer 302.

4. Where sending requests of video data are received from a plurality of client computers:

There will be explained a case where the server computer 300 receives the sending request of video data from the client computer 301, and at the same time, receives the sending request of video data from the client computer 302. In this case, video data sending part 104 receives the sending requests of client computer 301 and client computer 302 from video data read part 103 at the same time.

In this case, when the total of regeneration rates required for the video data sent to the two client computers is smaller than the maximum data sending rate of the computer network, the video data can be sent without disturbing the regeneration rate of video.

Figure 3:
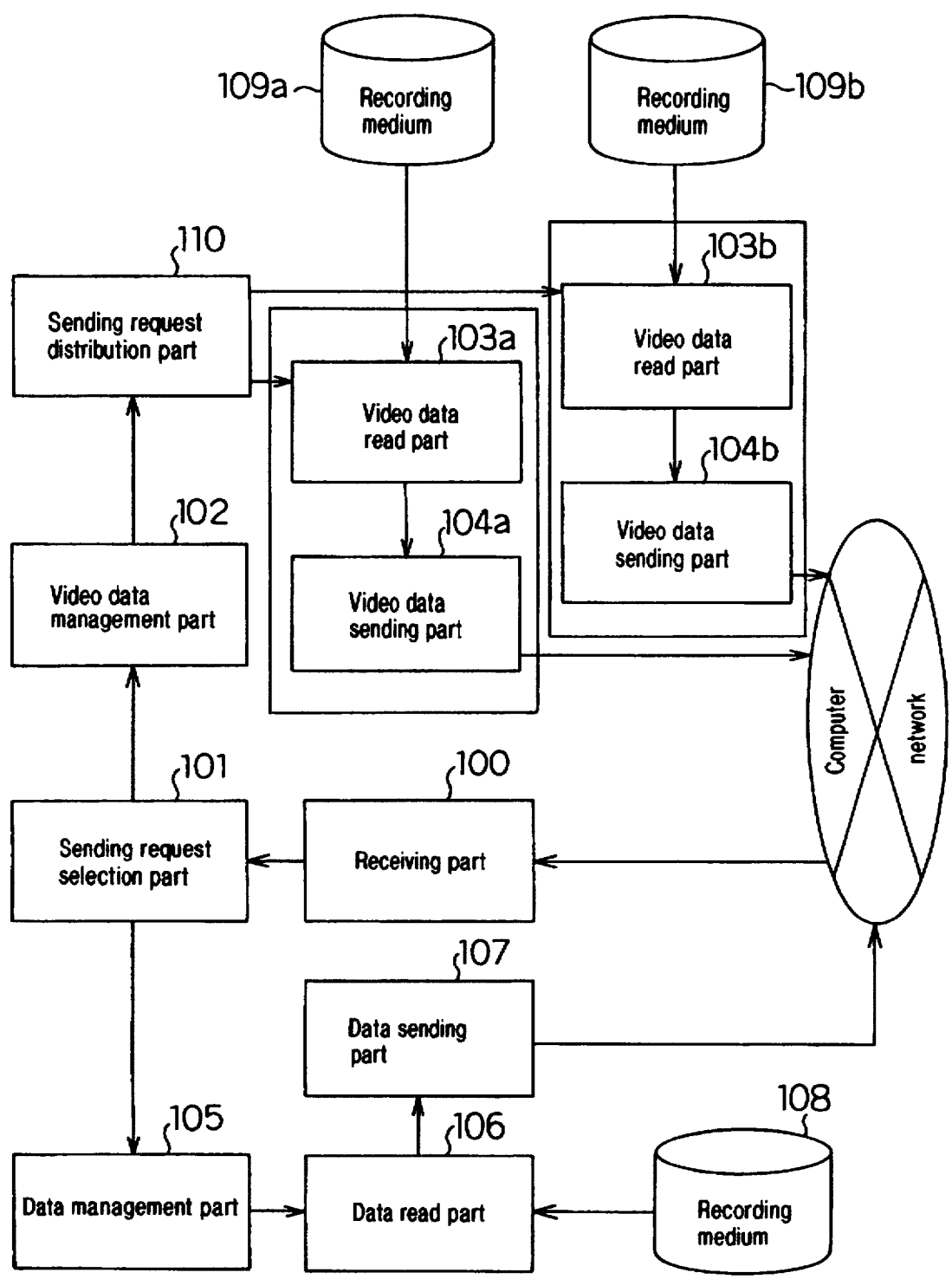
FIG. 3 is a block diagram of a second embodiment in connection with a video data sending device of the present invention.
Figure 4:
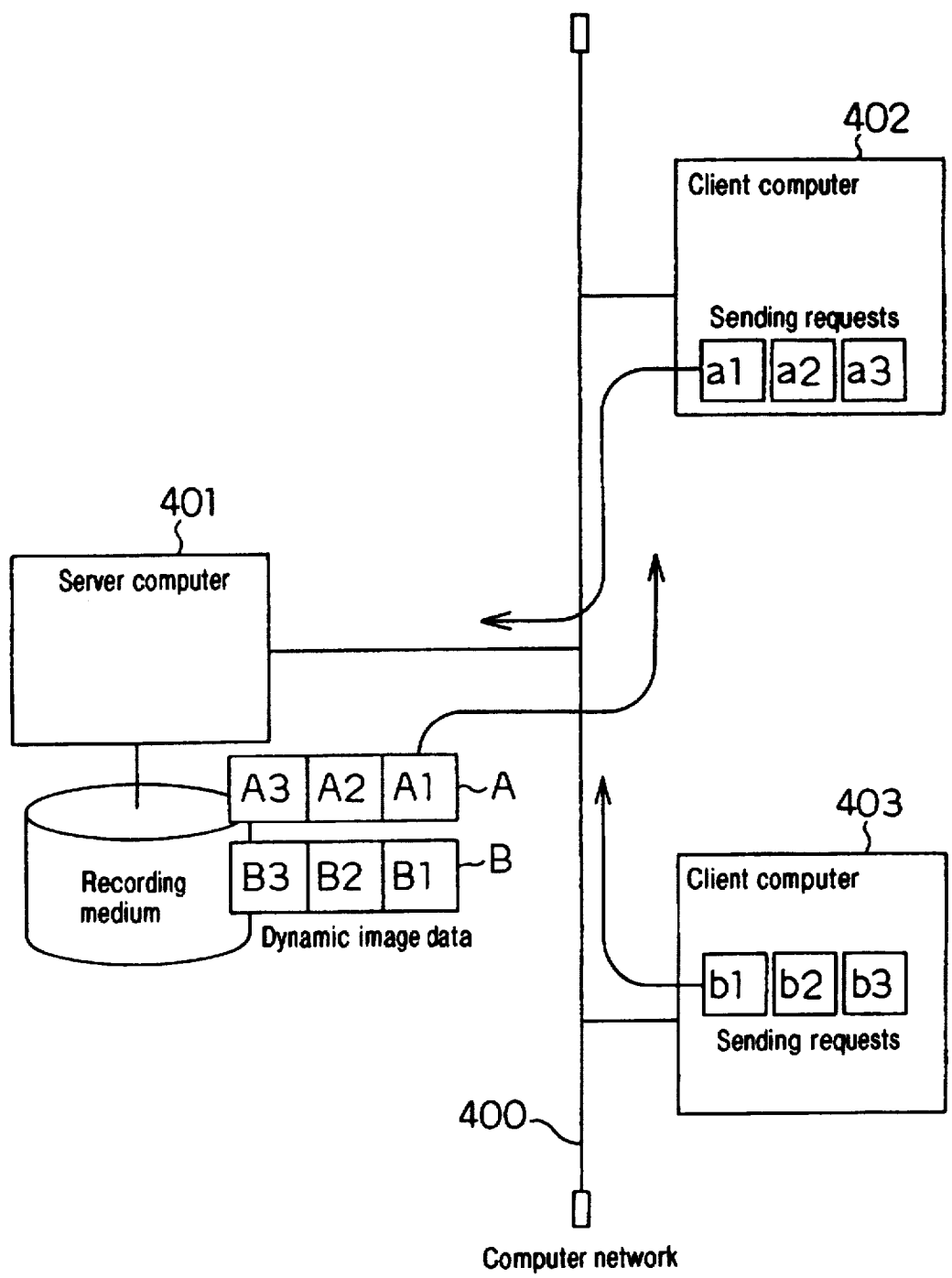
FIG. 4 is a typical diagram showing a procedure of sending data in a conventional computer network.
Figure 5:
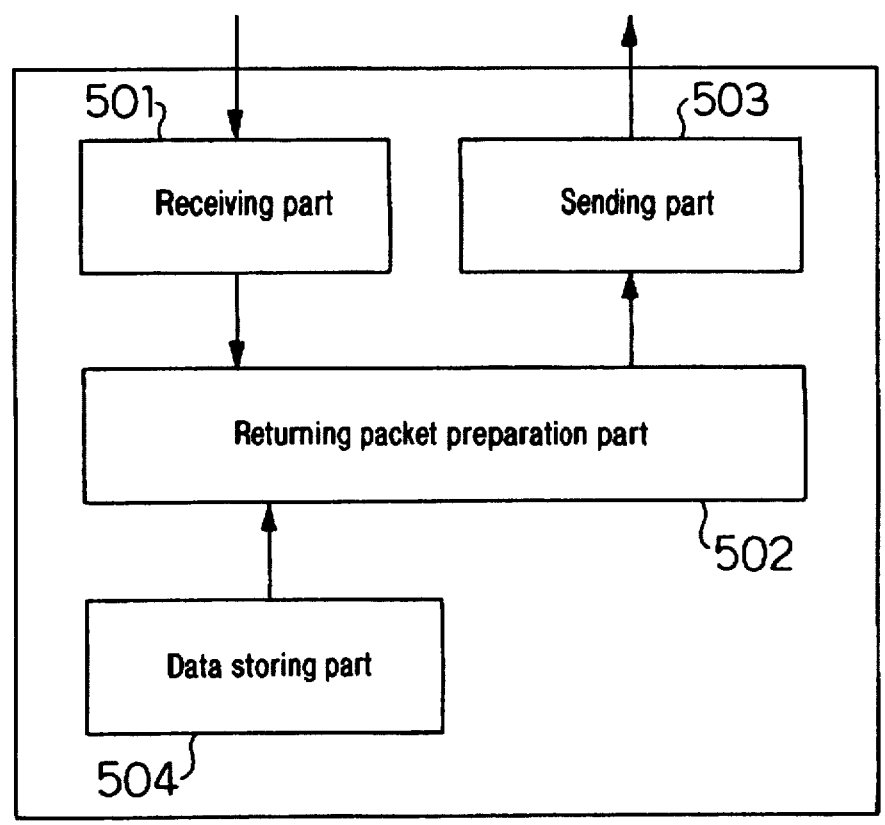
FIG. 5 is a block diagram of a conventional data returning device.

Referring to FIG. 3, there is shown therein a block diagram of a second embodiment in connection with a video data sending device of the present invention. A difference between this embodiment and the first embodiment is that this embodiment has plural sets of video data read part and video data sending part. The video data sending device of this embodiment comprises receiving part 100, sending request selection part 101, video data management part 102, sending request distribution part 110, video data read part 103a, video data sending part 104a, video data read part 103b, video data sending part 104b, data management part 105, data read part 106 and data sending part 107.

With reference to FIG. 3, the sending procedure of the video data in this embodiment will be explained hereinafter. The receiving part 100 receives the sending request of video data and sends it to the sending request selection part 101. The sending request selection part 101 inquires where the data corresponding to the received sending request are managed from the video data management part 102 and the data management part 105, and sends the sending request to the managing side. In this case, since the sending request is for video data, the sending request selection part 101 sends the sending request to the video data management part 102. The video data management part 102 sends the sending request to the sending request distribution part 110. The sending request distribution part 110 distributes the sending request from a recording medium (109a or 109b) having stored the video data corresponding to the sending request to video data read part (103a or 103b) for reading video data.

For example, if the video data corresponding to the sending request has been stored in the recording medium 109a from which the video data read part 103a reads data, the sending request distribution part 110 will send the sending request to the video data read part 103a and directs the video data read part 103a to read the data corresponding to the sending request. The video data read part 103a reads the video data from the recording medium 109a having stored the video data, and sends the data to the video data sending part 104a. The video data sending part 104a returns the received video data to a terminal at a regeneration rate of the video.

Similarly, if the video data corresponding to the sending request has been stored in the recording medium 109b from which the video data read part 103b reads data, the sending request distribution part 110 will send the sending request to the video data read part 103b and directs the video data read part 103b to read the data corresponding to the sending request. The video data read part 103b reads the video data from the recording medium 109b having stored the video data, and sends the data to the video data sending part 104b. The video data sending part 104b returns the received video data to a terminal at a regeneration rate of the video.

As apparent from the above-mentioned the sending procedure, the video data sending device of the present invention has an effect that the sending request of data other than video data and the sending request of video data can be parallel processed without being affected with each other.

Also, the video data sending device of the present invention has an effect that the sending request of video data from a plurality of terminals can be parallel processed.

Also, according to the video data sending device of the present invention including plural sets of video data read part and video data sending part, the ability to send video data can be easily extended. This allows the number of video data capable of being sent at the same time to be easily increased, and the number of terminals capable of sending data at the same time to be easily extended.

Figure 11:
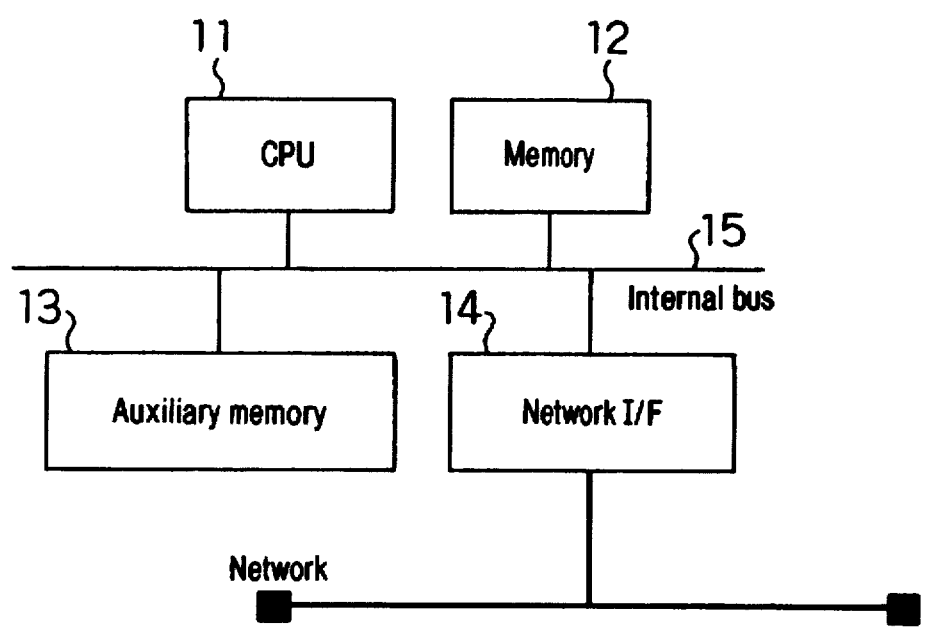

Although in the above-mentioned embodiments, the video data sending device is configured on the basis of the block diagram shown in FIG. 1, FIG.2 or FIG. 3, the device is not always to limited to the diagram, and the video data sending device of the present invention may be configured on the basis of the block diagram shown in FIG. 11, and the components of the video data sending device may be configured in software by the use of the hardware and the program executing the processing of the sending procedure explained in the above-mentioned execution modes. That is, the hardware of the video data sending device may be configured by a CPU 11 executing arithmetic processing and the like, a memory 12 which is a buffer or a work area, an auxiliary memory 13 for storing data such as image, voice and character, a network I/F 14 executing sending/receiving of data, and an internal bus 15 in which the data among the memory 12, the auxiliary memory 13 and the network I/F 14 flow.

Also, although each of the above-mentioned embodiments has a configuration in which a recording medium is provided for each data read part, without being limited to the configuration, a configuration may be employed in which one recording medium is divided for each area to store respective data.

Also, although in the above-mentioned second embodiment, an example having two sets of video read part and video sending part has been explained, two sets or more of video read part and video sending part may of course be employed.

Figure 6:
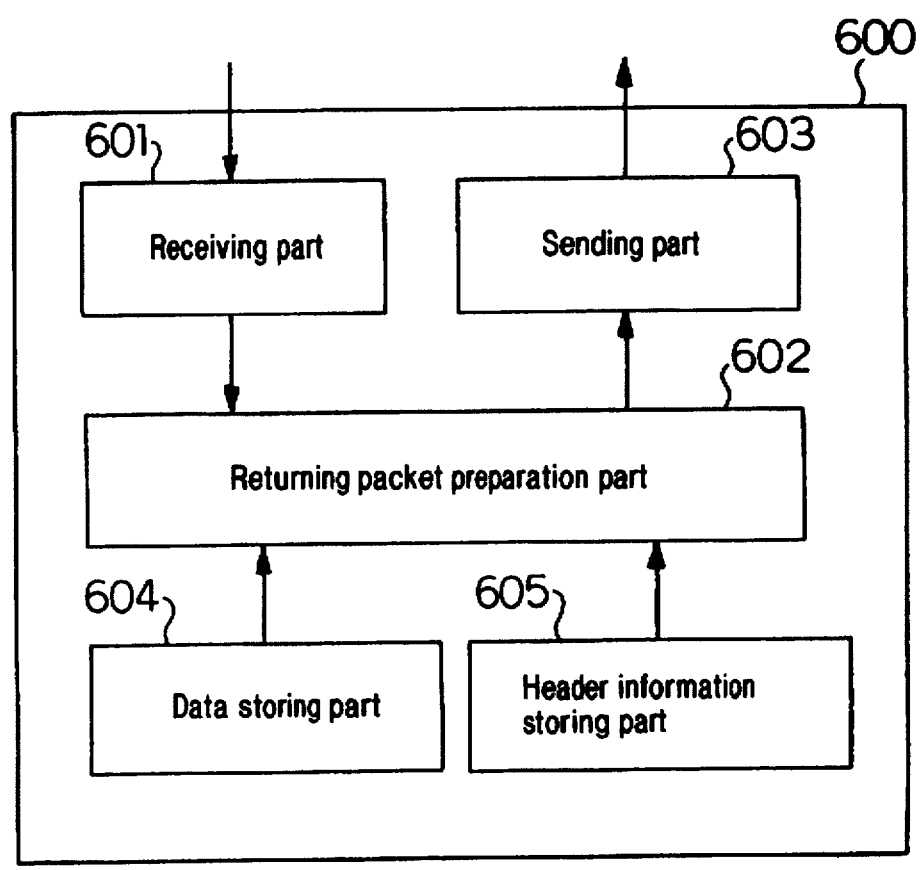
FIG. 6 is a block diagram of a first embodiment in connection with a data high-rate returning device of the present invention.

With reference to FIG. 6, a first embodiment in connection with a data high-rate returning device of the present invention will be explained. A data high-rate returning device 600 comprises a receiving part 601, a returning packet preparation part 602, a sending part 603, a data storing part 604 and a header information storing part 605.

Assume, however, that the compute network of this embodiment is the Ethernet. Also, assume that the number of sending sources each of which sends a sending request is five, and that the header information storing part 605 has been previously stored with a set of sending-request-packet header information (header information of a packet with a sending request) and returning packet header information (header information of a returning packet) as shown in FIG. 8. Further, assume that the sending-request-packet header information and the returning packet header information are composed of a sending source Ethernet address, a sending destination Ethernet address and a protocol ID.

With reference to FIG. 6 and FIG. 8, the operation of this embodiment will be explained hereinafter. The receiving part 601 receives a packet with a sending request and transfers it to the returning packet preparation part 602. The returning packet preparation part 602 obtains sending-request-packet header information from the header part of the packet with a sending request.

Now, assume that the returning packet preparation part 602 obtains, for example, a sending-request-packet header 3. The returning packet preparation part 602 refers to the header information storing part 605 on the basis of the sending-request-packet header 3, whereby the returning packet preparation part 602 obtains a returning packet header 3 as returning packet header information corresponding to the sending-request-packet header 3.

Also, the returning packet preparation part 602 refers to information of returning data requested in the data part of the packet with a sending request, obtains the returning data corresponding to the information of the data part of the packet from the data storing part 604, and combines the returning data with the returning packet header 3 to prepare the returning packet. The sending part 603 returns the returning packet prepared by the returning packet preparation part 602 to an appropriate destination.

In such a case, the number of destinations of the returning packets is five, so that the capacity of the header information storing part 605 requires a small one.

Figure 7:
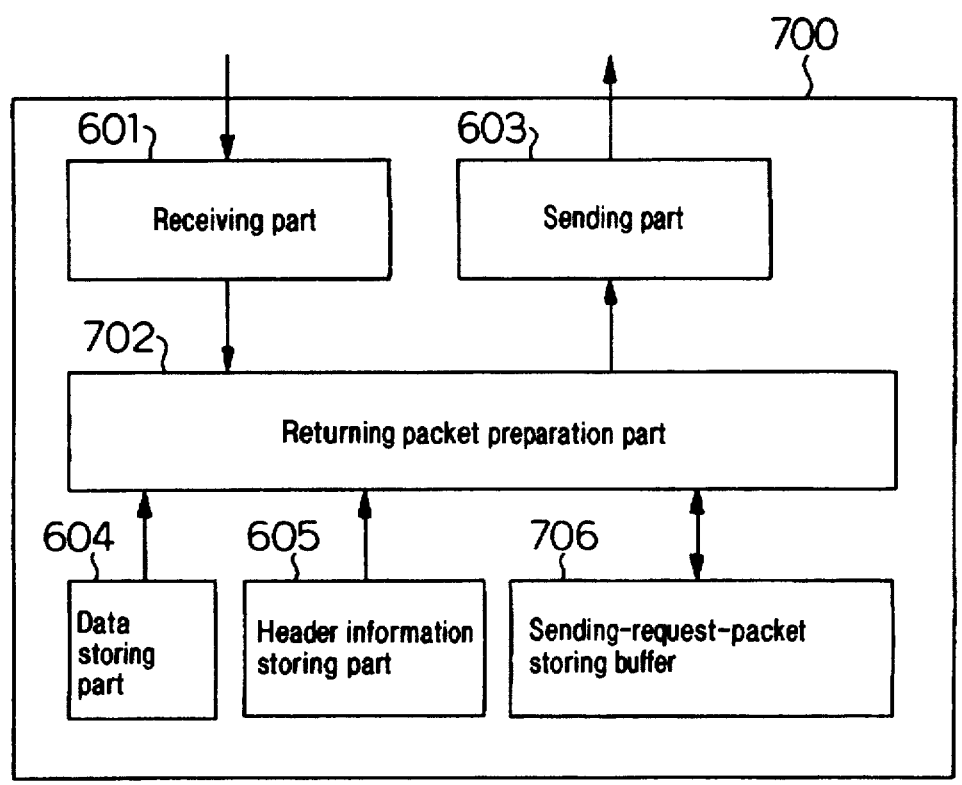
FIG. 7 is a block diagram of a second embodiment in connection with a data high-rate returning device of the present invention.

With reference to FIG. 7, a second embodiment in connection with a data high-rate returning device of the present invention will be explained. A data high-rate returning device 700 comprises a receiving part 601, a returning packet preparation part 702, a sending part 603, a data storing part 604, a header information storing part 605 and a sending-request-packet storing buffer 706.

Assume, however, that the computer network of this embodiment is the Ethernet. Also, assume that the number of sending sources each of which sends a sending request is five, and that the header information storing part 605 has been previously stored with a set of sending-request-packet header information and returning packet header information as shown in FIG. 8. Further, assume that the sending-request-packet header information and the receiving packet header information are composed of a sending source Ethernet address, a sending destination Ethernet address and a protocol ID. Further, assume that the number of sending-request-packets stored in the sending-request-packet storing buffer 706 has been previously set at ten.

With reference to FIG. 7, FIG. 8 and FIG. 9, the operation of this embodiment will be explained hereinafter. The receiving part 601 receives packets each of which has a sending request and stores them up to ten in the sending-request-packet storing buffer 706 in the order of being received.

Now, assume that, for example, the header parts of the ten packets have been stored in the sending-request-packet storing buffer 706 in the following order: a sending-request-packet header 5, a sending-request-packet header 2, a sending-request-packet header 4, a sending-request-packet header 4, a sending-request-packet header 2, a sending-request-packet header 4, a sending-request-packet header 5, a sending-request-packet header 5, a sending-request-packet header 2, and followed by a sending-request-packet header 5. These ten packets are sorted by the header part. In this case, the sending-request-packet headers after being sorted become the following order: the sending-request-packet header 2, the sending-request-packet header 2, the sending-request-packet header 2, the sending-request-packet header 4, the sending-request-packet header 4, the sending-request-packet header 4, the sending-request-packet header 5, the sending-request-packet header 5, the sending-request-packet header 5, and followed by the sending-request-packet header 5. Respective sending request-packets-taken out after being sorted are taken as a sending-request-packet 1', a sending-request-packet 2', a sending-request-packet 3', . . . . . a sending-request-packet 10'. In this case the sending-request-packet 1' is a sending-request-packet having the sending-request-packet header 2 which has been received earliest among those having the sending-request-packet header 2.

The ten sending-request-packets having been sorted by the sending-request-packet storing buffer 706 are transferred to the returning packet preparation part 702 in the order of being sorted. There turning packet preparation part 702 obtains the sending-request-packet header 2 as the sending-request-packet header information from the header part of the sending-request-packet 1'. The returning packet preparation part 702 refers to the header information storing part 605, and obtains the returning packet header 2 as the sending-request-packet header information corresponding to the sending-request-packet header 2.

Also, the returning packet preparation part 702 refers to the data part of the sending-request-packet 1', obtains the returning data corresponding to the information of the data part of the sending-request-packet 1' from the data storing part 604, and combines the returning data with the returning packet header 2 to prepare the returning packet. The sending part 603 returns the returning packet prepared by the returning packet preparation part 702 to the appropriate destination.

Then, the returning packet preparation part 702 receives the sending-request-packet 2' having the same sending-request-packet header 2. Then, the returning packet preparation part 702 refers to the header information storing part 605. In this case, since the same information is referred, the operation becomes higher in rate than a case where a different sending-request-packet header, for example, 4 is referred. Thereafter, the returning packet preparation part 702 prepares the returning data in a similar manner to the above-mentioned operation.

Further, the returning packet preparation part 702 receives the sending-request-packet 3' having the same sending-request-packet header 2. Also, in this case, as with the above-mentioned operation, the returning data is prepared by a high-rate operation.

Further, the returning packet preparation part 702 receives the sending-request-packet 4' having the same sending-request-packet header 4. In this case, since a different sending-request-packet header is referred, the returning data is prepared by obtaining the returning packet header 4 as with the above-mentioned operation.

Thereafter, in a similar manner, the returning packet preparation part 702 executes the processing on the remaining six packets after being sorted.

As apparent from the above-mentioned procedure, the data high-rate returning device of the present invention has an effect that the providing of the header information storing part allows the processing of preparing the header part of the returning packet to become higher in rate. As a result, it becomes possible to shorten the amount of time between packet receiving and returning packet sending. Particularly, where a few sending sources send packets each of which has a sending request of many packets, a small-scale header information storing part can execute the processing. As a result, only a small-scale modification to a conventional configuration allows a high-rate returning procedure.

Also, according to the data high-rate returning device of the present invention including a receiving packet storing buffer, the amount of time between sending-request-packet receiving and returning packet sending can be efficiently shortened. Particularly, where a few sending sources send packets each of which has a sending request of many packets, a small-scale receiving packet storing buffer can execute the processing. As a result, only a small-scale modification to a conventional configuration allows a high-rate returning procedure.

Although in the above-mentioned embodiments, the data high-rate returning device is configured on the basis of the block diagram shown in FIG. 6 or FIG. 7, the device is not always to limited to the diagram, and the data high-rate returning device of the present invention may be configured on the basis of the block diagram shown in FIG. 11, and some of the components of the data high-rate returning device may be configured in software by the use of the hardware and the program executing the processing of the sending procedure explained in the above-mentioned execution modes. That is, the hardware of the data high-rate returning device may be configured by a CPU 11 executing arithmetic processing and the like, a memory 12 which is a buffer or a work area, an auxiliary memory 13 for storing data such as image, voice and character, a network I/F 14 executing sending/receiving of data, and an internal bus 15 in which the data among the memory 12, the auxiliary memory 13 and the network I/F 14 flow.

Also, although in the above-mentioned embodiments, the returning packet preparation part 602 or 702 refers to the header information storing part 605 even when the header of the transferred sending-request-packet is the same, the procedure is not always to limited to it, and the returning packet preparation part 602 or 702 may not refer to the header information storing part 605 when the header of the sending-request-packet is the same, and may utilize the content of the returning packet header, as is, corresponding to the previously processed sending-request-packet header to prepare the returning packet.

Figure 10:
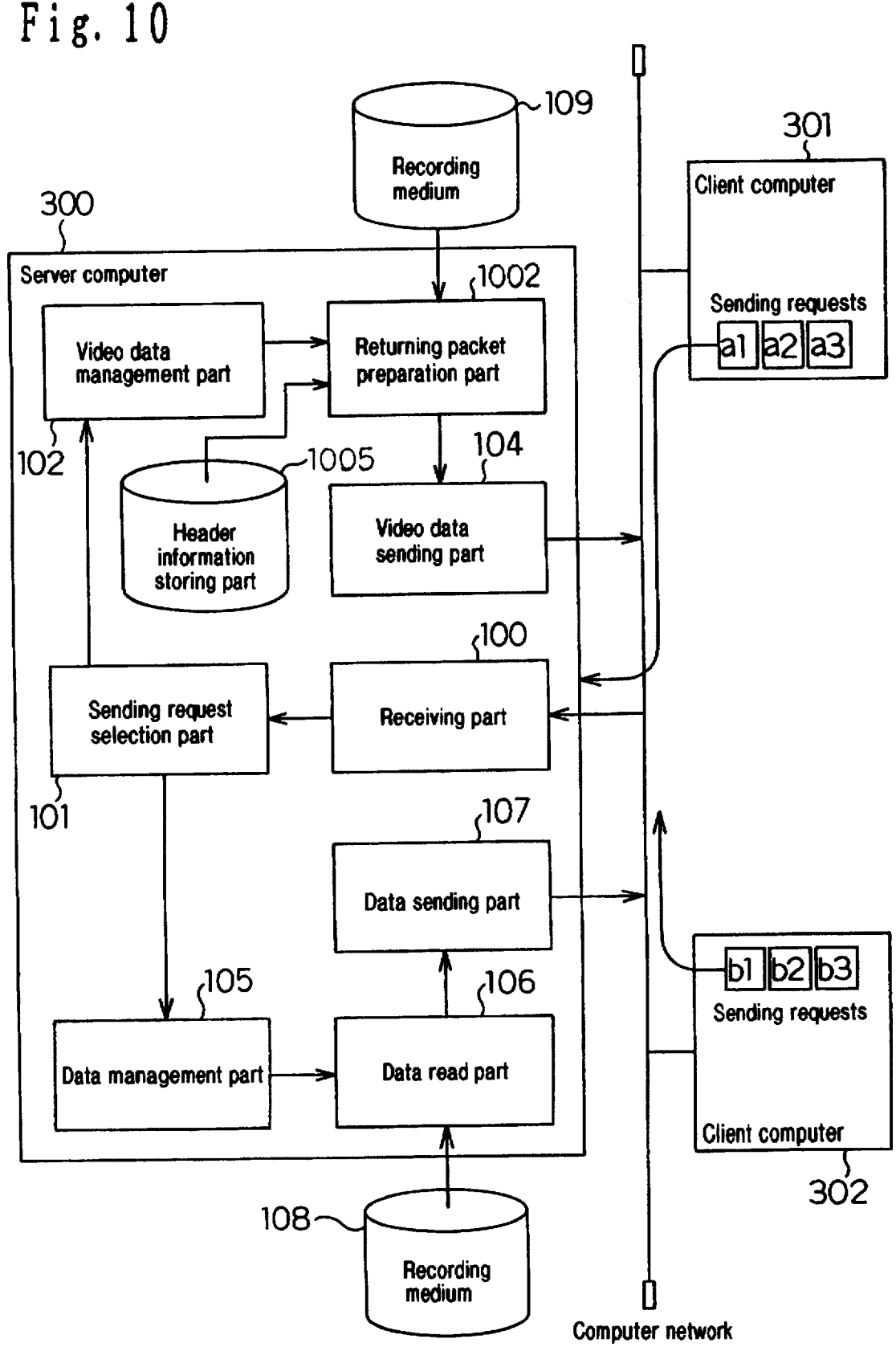
FIG. 10 is a block diagram of another embodiment in connection with a video data sending device with a data high-rate returning device.

Referring to FIG. 10, there is shown therein a block diagram of a first embodiment in connection with a video data sending device of the present invention with a data high-rate returning device of the present invention. The video data sending device comprises receiving part 100, sending request selection part 101, video data management part 102, returning packet preparation part 1002, video data sending part 104, data management part 105, data read part 106, data sending part 107 and header information storing part 1005.

Assume, however, that the compute network of this embodiment is the Ethernet. Also, assume that the number of sending sources each of which sends a sending request is five, and that the header information storing part 1005 has been previously stored with a set of sending-request-packet header information (header information of a packet with a sending request) and returning packet header information (header information of a returning packet) as shown in FIG. 8. Further, assume that the sending-request-packet header information and the returning packet header information are composed of a sending source Ethernet address, a sending destination Ethernet address and a protocol ID.

With reference to FIG. 10, the operation of each part of the video data sending device in this embodiment will be explained hereinafter. The receiving part 100 receives a packet with a sending request sent through a computer network from a terminal. The sending request selection part 101 selectively determines whether the sending request from the terminal received at the receiving part 100 is either the sending request for the video data managed at the video data management part 102 or the sending request for the data managed at the data management part 105.

The video data management part 102 manages all video data stored in a recording medium 109, and sends the packet with a sending request to the returning packet preparation part 1002.

The returning packet preparation part 1002 executes the same operation as the returning packet preparation part 602 of FIG. 6 executes. The returning packet preparation part 1002 obtains sending-request-packet header information from the header part of the packet with a sending request. Now, assume that the returning packet preparation part 1002 obtains, for example, a sending-request-packet header 3. The returning packet preparation part 1002 refers to the header information storing part 1005 on the basis of the sending-request-packet header 3, whereby the returning packet preparation part 1002 obtains a returning packet header 3 as returning packet header information corresponding to the sending-request-packet header 3. Also, the returning packet preparation part 1002 refers to information of returning data requested in the data part of the packet with a sending request, obtains the returning data corresponding to the information of the data part of the packet from the recording medium 107, and combines the returning data with the returning packet header 3 to prepare the returning packet.

The video data sending part 104 returns the returning packet prepared by the returning packet preparation part 1002 at a regeneration rate thereof through the computer network to the terminal having sent the sending request for the video data.

Figure 12:
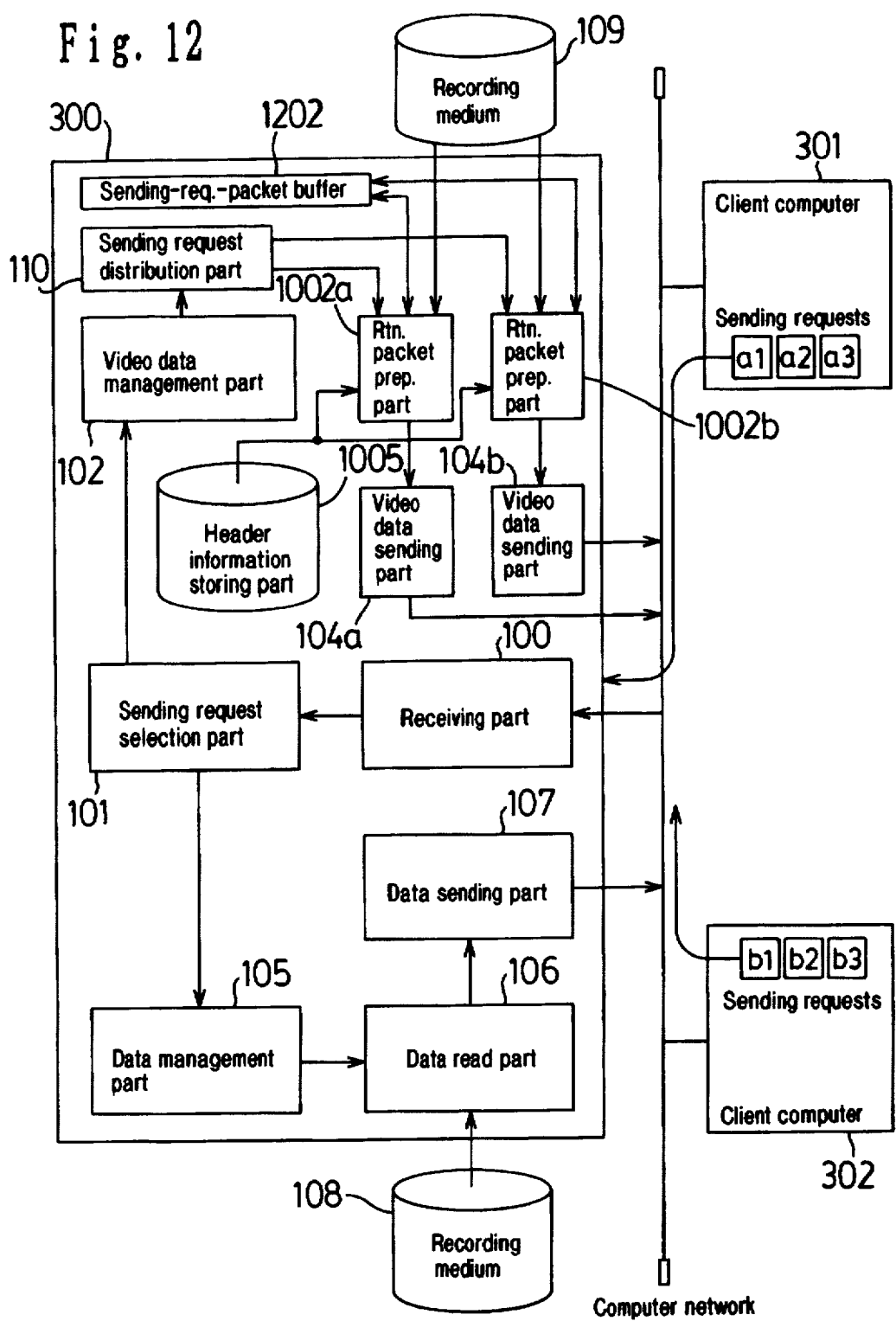
FIG. 12 is a block diagram of a second embodiment in connection with a video data sending device with a data high-rate returning device.

On the other hand, the data management part 105 manages other data excluding the video data, and directs the data read part 106 to read the data for the sending request. The data read part 106 obtains the returning data corresponding to the information of the data part of the packet from the recording medium 108, and combines the returning data with the returning packet header to prepare the returning packet. The data sending part 107 returns the returning packet excluding video data (or audio video data) through the computer network to the terminal. Referring to FIG. 12, there is shown a block diagram of a second embodiment in connection with a video data sending device of the present invention with a data high-rate returning device of the present invention. The second embodiment is the same as the first embodiment with the addition of a sending-request-packet storing buffer 1202, sending request distribution part 110, replacement of returning packet preparation part 1002 with plural returning packet preparation part 1002a and 1002b and replacement of video data sending part 104 with plural video data sending part 104a and 104b. The function of sending request distribution part 110 and plural video data sending part 104a and 104b are discussed above with respect to the embodiment of FIG. 3 and will not be repeated.

The video data management part 102 is connected to sending request distribution part 110 which in turn is connected to plural returning packet preparation part 1002a and 1002b. Plural returning packet preparation part 1002a and 1002b are connected to plural video data sending part 104a and 104b, respectively. Plural video data sending part 104a and 104b are connected to client computer 301, 302 via the computer network.

The sending-request-packet storing buffer 1202 stores a plurality of packets received by the receiving part and sorts the packets by respective header parts. The plural returning packet preparation parts 1002a, 1002b obtain the sending-request-packet header information from each of the packets transferred according to the sorted order from the sending-request-packet storing buffer 1202. In all other respects, the operation of the second embodiment is identical to the operation of the first embodiment.

Although in the embodiments, the block of 106 is the data read part which is the same as the data read part of FIG. 1, the block is not always to limited to it, and the block may be the returning packet preparation part with header information storing part as the returning packet preparation part 1002 with the header information storing part 1005.

What is claimed is:

1. A video data sending device, comprising:

a receiving part for receiving a sending request sent from each of plural terminals to receive either video data or data other than video data, the video data being stored in a video data storing part, the data other than video data being stored in a data storing part;

a sending request selection part for selectively determining whether the sending request received by said receiving part is either the one relating to the video data or the one relating to the data other than video data;

a video data management part which where the sending request selectively determined by said sending request selection part is the one relating to the video data, executes sending control of the video data;

a video data read part for reading the video data from said video data storing part according to the sending control of the video data;

a video data sending part for returning the video data read by said video data read part to a terminal corresponding to the send request;

a data management part which where the sending request selectively determined by said sending request selection part is the one relating to the data other than video data, executes sending control of the data;

a data read part for reading the data other than video data from said data storing part according to the sending control of the data; and a data sending part for returning the data other than video data read by said data read part to said terminal corresponding to the sending request.

2. A video data sending device according to claim 1, wherein:

there are plural sets of said video data read part and said video data sending part; and a sending request distribution part provides the sending control by said video data management part for said video data read part belonging to any set of the plural sets.

3. A data high-rate returning device, comprising:

a data storing part in which returning data has been stored;

a receiving part for receiving a packet having a sending request sent from each of plural terminals connected to a network, the packet being composed of a header part and a data part;

a header information storing part in which there have been previously stored plural sets of data composed of a set of sending-request-packet header information included in the packet received by said receiving part and returning packet header information corresponding to the sending-request-packet header information;

a returning packet preparation part which obtains the sending-request-packet header information from the packet received by said receiving part, obtains the returning packet header information corresponding to the obtained sending-request-packet header information from said header information storing part, obtains returning data from said data storing part on the basis of the data part included in the packet having the obtained sending-request-packet header information, and prepares at least one returning packet by the obtained returning packet header information and the obtained returning data; and a sending part for sending at least the one returning packet prepared by said returning packet preparation part to a respective one of said plural terminals on the basis of the returning packet header information included in the prepared returning packet.

4. A data high-rate returning device according to claim 3, further comprising:

a sending-request-packet storing buffer stores a plurality of packets received by said receiving part, and sorts the packets by respective header parts; and wherein said returning packet preparation part obtains the sending-request-packet header information for each of the packets transferred according to the sorted order from said sending-request-packet storing buffer, and executes further processing.

5. A data high-rate returning device, comprising:

a data storing part in which returning data has been stored;

a receiving part for receiving a packet having a sending request sent from each of plural terminals connected to a network, the packet being composed of a header part and a data part;

a header information storing part in which there have been previously stored plural sets of data composed of a set of sending-request-packet header information included in the packet received by said receiving part and returning packet header information corresponding to the sending-request-packet header information;

a returning packet preparation part which obtains the sending-request-packet header information from the packet received by said receiving part, and where the obtained sending-request-packet header information is different from the preceding one, obtains the returning packet header information corresponding to the obtained sending-request-packet header information from said header information storing part, obtains returning data from said data storing part on the basis of the data part included in the packet having the obtained sending-request-packet header information, and prepares at least one returning packet by the obtained returning packet header information and the obtained returning data, and where the obtained sending-request-packet header information is the same as the preceding one, obtains the returning packet header information corresponding to the obtained sending-request-packet header information from said header information storing part, obtains returning data from said data storing part on the basis of the data part included in the packet having the obtained sending-request-packet header information, and prepares at least one returning packet by the previously obtained returning packet header information and the obtained returning data; and a sending part for sending at least the one returning packet prepared by said returning packet preparation part to a respective one of said plural terminals on the basis of the returning packet header information included in the prepared returning packet.

6. A data high-rate returning device according to claim 5, further comprising:

a sending-request-packet storing buffer stores a plurality of packets received by said receiving part, and sorts the packets by respective header parts; and wherein said returning packet preparation part obtains the sending-request-packet header information for each of the packets transferred according to the sorted order from said sending-request-packet storing buffer, and executes further processing.

7. A video data sending device, comprising:

a receiving part for receiving a packet having a sending request sent from each of plural terminals connected to a network to receive either video data or data other than video data, the packet being composed of a header part and a data part, the video data being stored in a video data storing part, the data other than video data being stored in a data storing part;

a sending request selection part for selectively determining whether the packet received by said receiving part is either the one relating to the video data or the one relating to the data other than video data;

a video data management part which where the packet selectively determined by said sending request selection part is the one relating to the video data, executes sending control of the video data;

a header information storing part in which there have been previously stored plural sets of data composed of a set of sending-request-packet header information included in the packet received by said receiving part and returning packet header information corresponding to the sending-request-packet header information;

a returning packet preparation part which obtains the sending-request-packet header information from the packet received by said receiving part according to the sending control of the video data, obtains the returning packet header information corresponding to the obtained sending-request-packet header information from said header information storing part, obtains the video data from said video data storing part on the basis of the data part included in the packet having the obtained sending-request-packet header information, and prepares at least one returning packet b the obtained returning packet header information and the obtained video data;

a video data sending part for sending at least the one returning packet prepared by said returning packet preparation part to a respective one of said plural terminals on the basis of the returning packet header information included in the prepared returning packet;

a data management part which where the packet selectively determined by said sending request selection part is the one relating to the data other than video data, executes sending control of the data;

a data read part for reading the data other than video data from said data storing part according to the sending control of the data; and a data sending part which generates at least one packet on the basis of the data other than video data read by said data read part, and returns the generated packet to said terminal corresponding to the generated packet.

8. A video data sending device according to claim 7, wherein:

there are plural sets of said returning packet preparation part and said video data sending part; and a sending request distribution part provides the sending control by said video data management part for said returning packet preparation part belonging to any set of the plural sets.

9. A video data sending device according to claim 7, further comprising:

a sending-request-packet storing buffer stores a plurality of packets received by said receiving part, and sorts the packets by respective header parts; and wherein said returning packet preparation part obtains the sending-request-packet header information for each of the packets transferred according to the sorted order from said sending-request-packet storing buffer, and executes further processing.

10. A video data sending device according to claim 8, further comprising:

a sending-request-packet storing buffer stores a plurality of packets received by said receiving part, and sorts the packets by respective header parts; and wherein said returning packet preparation part obtains the sending-request-packet header information for each of the packets transferred according to the sorted order from said sending-request-packet storing buffer, and executes further processing.

11. A video data sending device, comprising:

a receiving part for receiving a packet having a sending request sent from each of plural terminals connected to a network to receive either video data or data other than video data, the packet being composed of a header part and a data part, the video data being stored in a video data storing part, the data other than video data stored in a data storing part;

a sending request selection part for selectively determining whether the packet received by said receiving part is either the one relating to the video data or the one relating to the data other than video data;

a video data management part which where the packet selectively determined by said sending request selection part is the one relating to the video data, executes sending control of the video data;

a header information storing part in which there have been previously stored plural sets of data composed of a set of sending-request-packet header information included in the packet received by said receiving part and returning packet header information corresponding to the sending-request-packet header information;

a returning packet preparation part which obtains the sending-request-packet header information from the packet received by said receiving part according to the sending control of the video data, and where the obtained sending-request-packet header information is different from the preceding one, obtains the returning packet header information corresponding to the obtained sending-request-packet header information from said header information storing part, obtains the video data from said video data storing part on the basis of the data part included in the packet having the obtained sending-request-packet header information, and prepares at least one returning packet by the obtained returning packet header information and the obtained video data, and where the obtained sending-request-packet header information is the same as the preceding one, obtains the returning packet header information corresponding to the obtained sending-request-packet header information from said header information storing part, obtains the video data from said video data storing part on the basis of the data part included in the packet having the obtained sending-request-packet header information, and prepares at least one returning packet by the previously obtained returning packet header information and the obtained video data;

a video data sending part for sending at least the one returning packet prepared by said returning packet preparation part to a respective one of said plural terminals on the basis of the returning packet header information included in the prepared returning packet;

a data management part which where the packet selectively determined by said sending request selection part is the one relating to the data other than video data, executes sending control of the data;

a data read part for reading the data other than the video data from said data storing part according to the sending control by said data management part; and a data sending part which generates at least one packet on the basis of the data other than video data read by said data read part, and returns the generated packet to said terminal corresponding to the generated packet.

12. A video data sending device according to claim 11, wherein:

there are plural sets of said returning packet preparation part and said video data sending part; and a sending request distribution part provides the sending control by said video data management part for said returning packet preparation part belonging to any set of the plural sets.

13. A video data sending device according to claim 11, further comprising:

a sending-request-packet storing buffer stores a plurality of packets received by said receiving part, and sorts the packets by respective header parts; and wherein said returning packet preparation part obtains the sending-request-packet header information for each of the packets transferred according to the sorted order from said sending-request-packet storing buffer, and executes further processing.

14. A video data sending device according to claim 12, further comprising:

a sending-request-packet storing buffer stores a plurality of packets received by said receiving part, and sorts the packets by respective header parts; and wherein said returning packet preparation part obtains the sending-request-packet header information for each of the packets transferred according to the sorted order from said sending-request-packet storing buffer, and executes further processing.

15. A method for sending data between a data sending device and a plurality of terminals comprising the steps of:

(a) receiving a sending request sent from the plurality of terminals for one of video data and data other than video data;

(b) storing the video data;

(c) storing the data other than video data;

(d) determining whether the sending request corresponds to one of the video data and the data other than video data and producing a sending request signal;

(e) selectively controlling the video data and the data other than video data based on the sending request signal;

(f) reading the video data stored in Step (b) and the data other than video data stored in Step (c) responsive to the selective controlling step; and (g) sending one of the video data and the data other than video data read in Step (f) to a respective one of the plurality of terminals in accordance with the sending request.

16. A method according to claim 15, further comprising the step of (h) networking the data sending device and the plurality of terminals to send the data between the data sending device and the plurality of terminals.

* * * * *